US012691802B2

(12) United States Patent
Taylor et al.

(10) Patent No.: US 12,691,802 B2
(45) Date of Patent: Jul. 28, 2026

(54) SEAT FOR A VEHICLE

(71) Applicant: FERRARI S.P.A., Modena (IT)

(72) Inventors: Daniel Martin Taylor, Modena (IT); Andrea Moscardi, Modena (IT)

(73) Assignee: FERRARI S.P.A., Modena (IT)

( * ) Notice: Subject to any disclaimer, the term of this patent is extended or adjusted under 35 U.S.C. 154(b) by 328 days.

(21) Appl. No.: 18/511,359

(22) Filed: Nov. 16, 2023

(65) Prior Publication Data

US 2024/0174145 A1      May 30, 2024

(30) Foreign Application Priority Data

Nov. 25, 2022    (IT) ......................... 102022000024339

(51) Int. Cl.
B60N 2/56          (2006.01)
B60N 2/70          (2006.01)

(52) U.S. Cl.
CPC ......... B60N 2/5642 (2013.01); B60N 2/5628 (2013.01); B60N 2/7035 (2013.01)

(58) Field of Classification Search
CPC .... B60N 2/5642; B60N 2/5657; B60N 2/565; B60N 2/0268; B60N 2/5621
See application file for complete search history.

(56) References Cited

U.S. PATENT DOCUMENTS

| | | | | |
|---|---|---|---|---|
| 7,201,441 B2 * | 4/2007 | Stoewe | ................ | B60N 2/5635 |
| | | | | 297/180.13 |
| 10,106,062 B2 * | 10/2018 | Storgato | ............... | B60N 2/5621 |
| 10,821,862 B2 * | 11/2020 | Russman | ............. | B60N 2/5635 |
| 11,065,991 B2 * | 7/2021 | Iacovone | ............. | B60N 2/5642 |
| 11,135,946 B2 * | 10/2021 | Lodhia | ................. | A47C 31/126 |
| 11,142,106 B2 * | 10/2021 | Powell | ................. | B60N 2/5642 |
| 11,548,411 B2 * | 1/2023 | Lodhia | ................. | A47C 31/126 |
| 11,850,984 B1 * | 12/2023 | Wittenschlaeger | .. | B60N 2/0278 |
| 2009/0152909 A1 * | 6/2009 | Andersson | ........... | B60N 2/5642 |
| | | | | 297/180.13 |
| 2011/0260509 A1 | 10/2011 | Siu | | |

(Continued)

FOREIGN PATENT DOCUMENTS

| | | |
|---|---|---|
| DE | 102008022772 A1 | 12/2008 |
| EP | 3006262 A1 | 4/2016 |
| WO | 2018042049 A1 | 3/2018 |

OTHER PUBLICATIONS

Italian Search Report for Application No. 202200024339; Filing Date, Nov. 25, 2022; Mailing Date, May 10, 2023; 7 paeges.

*Primary Examiner* — Shin H Kim
(74) *Attorney, Agent, or Firm* — CANTOR COLBURN LLP

(57)          ABSTRACT

A seat for a vehicle and having: a cushion, which is configured to be fixed to a floorboard of the vehicle and is provided with a bearing structure, which is elastically yielding and has a net-like conformation, and with an upholstery, which covers the bearing structure; a diffuser, which at least partially engages a front wall of the bearing structure of the cushion and can be connected to a conditioned air supply duct in order to introduce conditioned air into the bearing structure of the cushion; and at least one insulating element, which is arranged along a lower wall and/or a side wall of the bearing structure of the cushion and is impermeable to air in order to prevent air from flowing out.

21 Claims, 4 Drawing Sheets

(56) References Cited

U.S. PATENT DOCUMENTS

| | | | |
|---|---|---|---|
| 2016/0096460 A1* | 4/2016 | Storgato ................. | B60N 2/565 |
| | | | 297/180.13 |
| 2018/0043805 A1* | 2/2018 | Baek .................... | B60N 2/7005 |
| 2019/0298072 A1* | 10/2019 | Bhatia .................... | B60N 2/565 |
| 2019/0351787 A1 | 11/2019 | Lodhia et al. | |
| 2021/0259425 A1* | 8/2021 | Michalak .............. | B33Y 50/00 |
| 2022/0275845 A1* | 9/2022 | Kabaria ................. | F16F 7/121 |
| 2023/0384761 A1* | 11/2023 | Mccutcheon .......... | G06T 19/20 |
| 2024/0174145 A1* | 5/2024 | Taylor ................. | B60N 2/7035 |
| 2024/0294101 A1* | 9/2024 | Taylor ................. | B60N 2/7017 |

* cited by examiner

SEAT FOR A VEHICLE

CROSS-REFERENCE TO RELATED APPLICATIONS

This patent application claims priority from Italian patent application no. 102022000024339 filed on Nov. 25, 2022, the entire disclosure of which is incorporated herein by reference.

TECHNICAL FIELD

The invention relates to a seat for a vehicle.

PRIOR ART

The seat of a vehicle consists of a seat cushion having a substantially horizontal arrangement and of a backrest having a substantially vertical arrangement.

From a constructive point of view, the seat of a vehicle comprises a frame (typically made of metal or composite material), which is fixed to the floorboard of the vehicle, a bearing structure, which is mounted on the frame and is elastically yielding, and an upholstery, which covers the bearing structure and makes up the aesthetic and tactile interface to the outside (the upholstery can be made of fabric or leather).

Manufacturers recently suggested manufacturing the bearing structure of a seat by means of a net-like structure, which is built with 3D printers (namely, through additive manufacturing).

Patent application DE102008022772A1 discloses a seat for a vehicle provided with a seat cushion, where there is obtained a path for an air flow, which flows through the seat cushion from the front to the back in order to reach and cool a battery pack arranged behind the seat.

DESCRIPTION OF THE INVENTION

The object of the invention is to provide a seat for a vehicle, which offers high comfort combined with reduced weight and small sizes.

According to the invention, there is provided a seat for a vehicle as claimed in the appended claims.

The appended claims describe preferred embodiments of the invention and form an integral part of the description.

BRIEF DESCRIPTION OF THE DRAWINGS

The invention will now be described with reference to the accompanying drawings, showing some non-limiting embodiments thereof.

Preferred Embodiments of the Invention

Figures 1, 2:
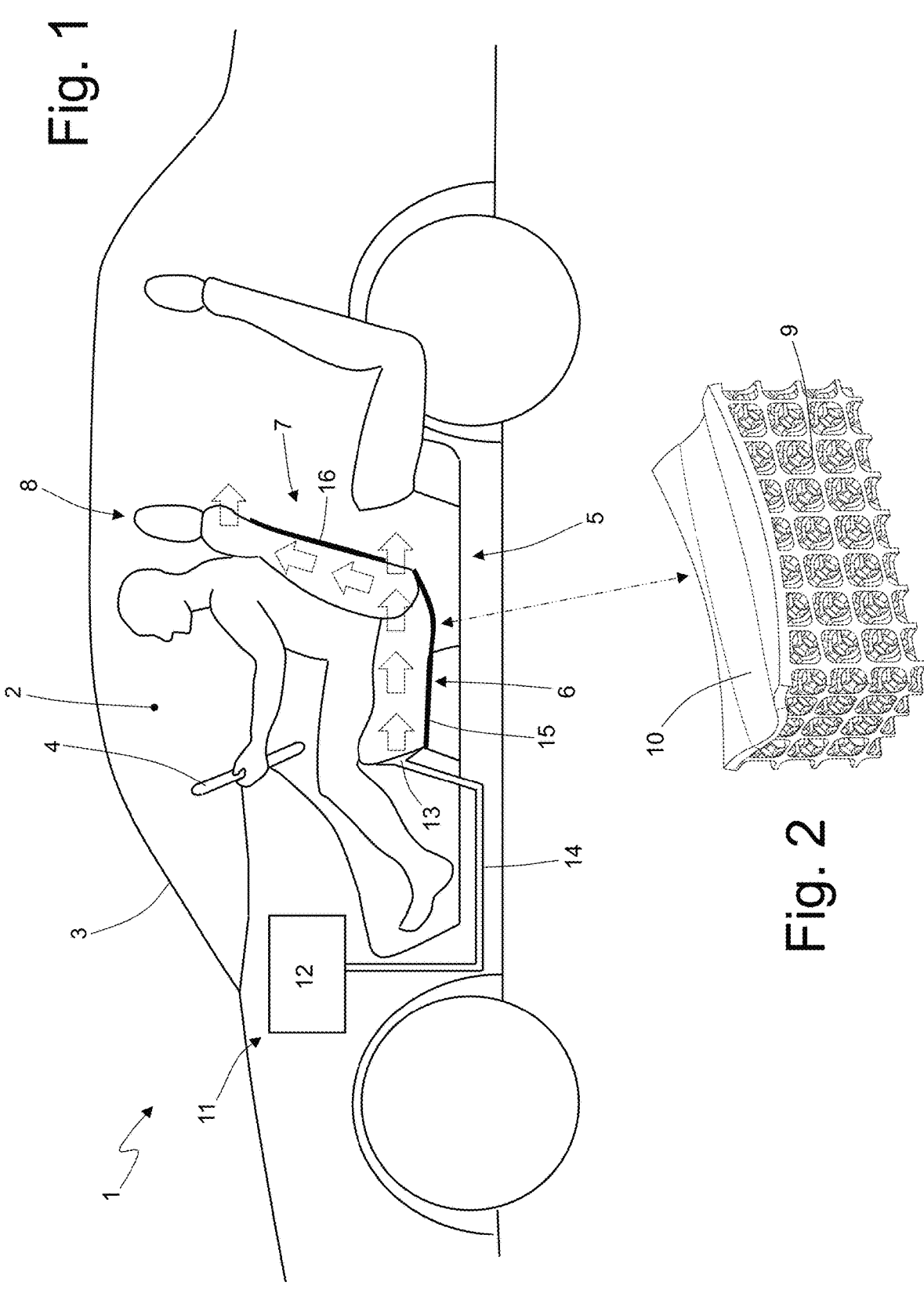
FIG. 1 is a schematic view of a car provided with a seat according to the invention.
FIG. 2 is a schematic view of a bearing structure of the seat of FIG. 1.

In FIG. 1, number 1 indicates, as a whole, a road vehicle (in particular, a car) provided with two steering front driven wheels and with two rear drive wheels, which receive the torque from a powertrain system (alternatively, all four wheels could be drive wheels or the sole front wheels could be drive wheels).

The road vehicle 1 comprises a passenger compartment 2 delimited, at the front, by a dashboard, which is arranged under a windshield 3, and delimited, at the bottom, by a floor. The dashboard supports a control panel arranged behind the steering wheel 4. In the passenger compartment 2 there are some seats 5, each designed to accommodate a corresponding passenger.

Each seat 5 consists of a seat cushion 6 having a substantially horizontal arrangement and of a backrest 7 having a substantially vertical arrangement; together, the cushion 6 and the backrest 7 give the seat 1 an "L" shape. The backrest 7 ends, at the top, with a headrest 8, which generally is included in the backrest 7 (namely, forms one single indivisible body with the backrest 7).

From a constructive point of view, each seat 5 comprises a frame (typically made of metal or composite material), which is fixed to the floorboard of the vehicle 1, a bearing structure 9, which is mounted on the frame and is elastically yielding, and an upholstery 10, which covers the bearing structure 9 and makes up the aesthetic and tactile interface to the outside (the upholstery 10 can be made of fabric or leather).

In the embodiment shown in FIG. 2, the bearing structure 9 of each seat 5 is completely made of TPU ("ThermoPlastic Polyurethane") by means of a multi-jet fusion process, has a net-like stricture (namely, the bearing structure 9 is net-like) and is built with 3D printers (namely, through additive manufacturing). The net-like bearing structure 9 is built by interlocking uprights according to suitable geometric schemes, mainly of the pyramid-like type. In other words, the bearing structure 9 consists of one single net-like layer and, hence, the bearing structure 9 is a single-layer structure.

Figure 3:
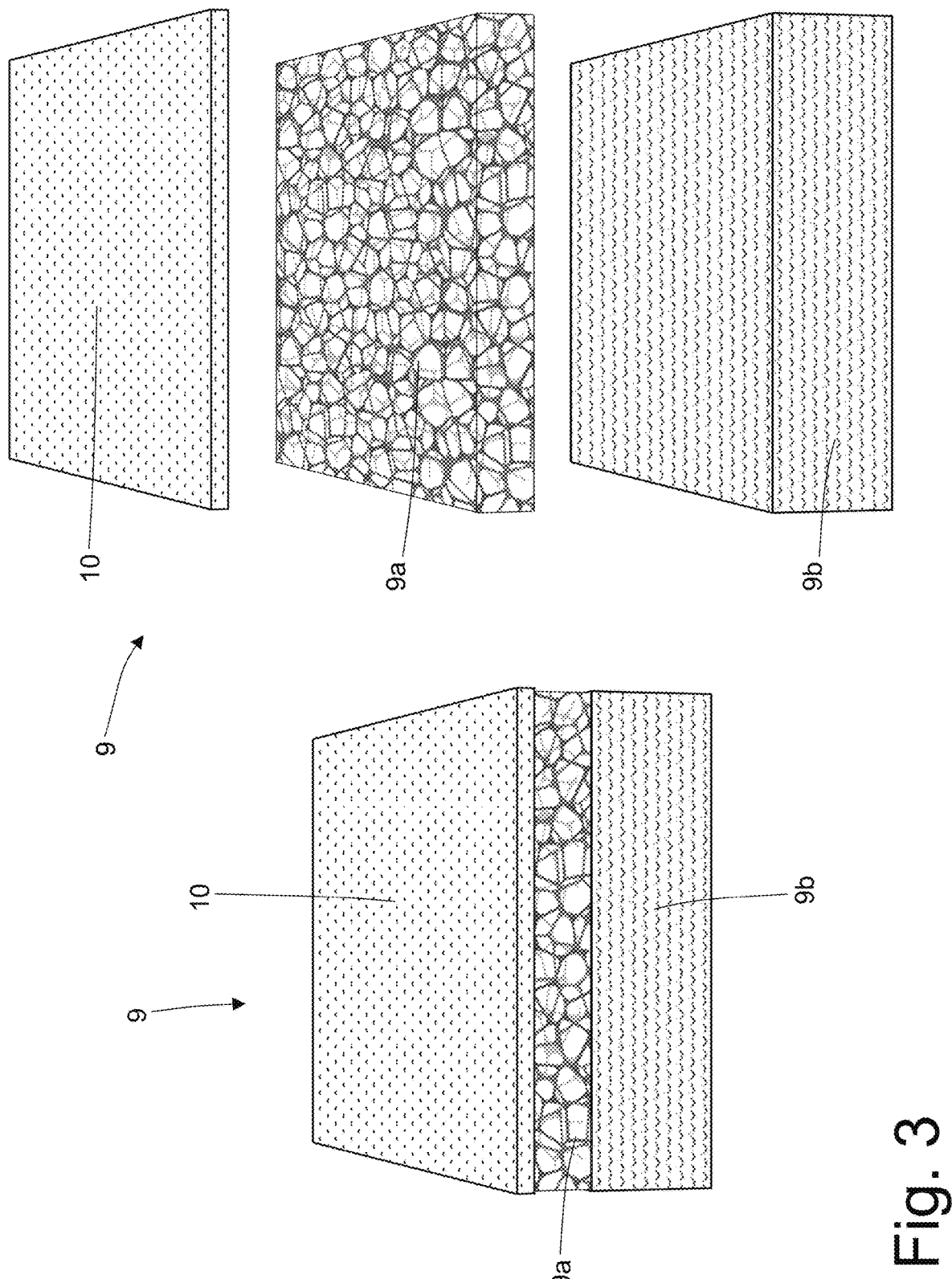
FIGS. 3 and 4 are schematic views of corresponding variants of the bearing structure of FIG. 2.

In the alternative embodiment shown in FIG. 3, the bearing structure 9 (only) consists of two layers 9a, 9b overlapping one another: the layer 9a is a net-like layer (like in the embodiment shown in FIG. 2), is in direct contact with the upholstery 10 and is made of TPU ("Thermoplastic Polyurethane"), whereas the layer 9b is solid and is made of a solid foam. In other words, the bearing structure 9 is a multi-layer structure and comprises one single net-like layer 9a and one single solid layer 9b.

Figure 4:
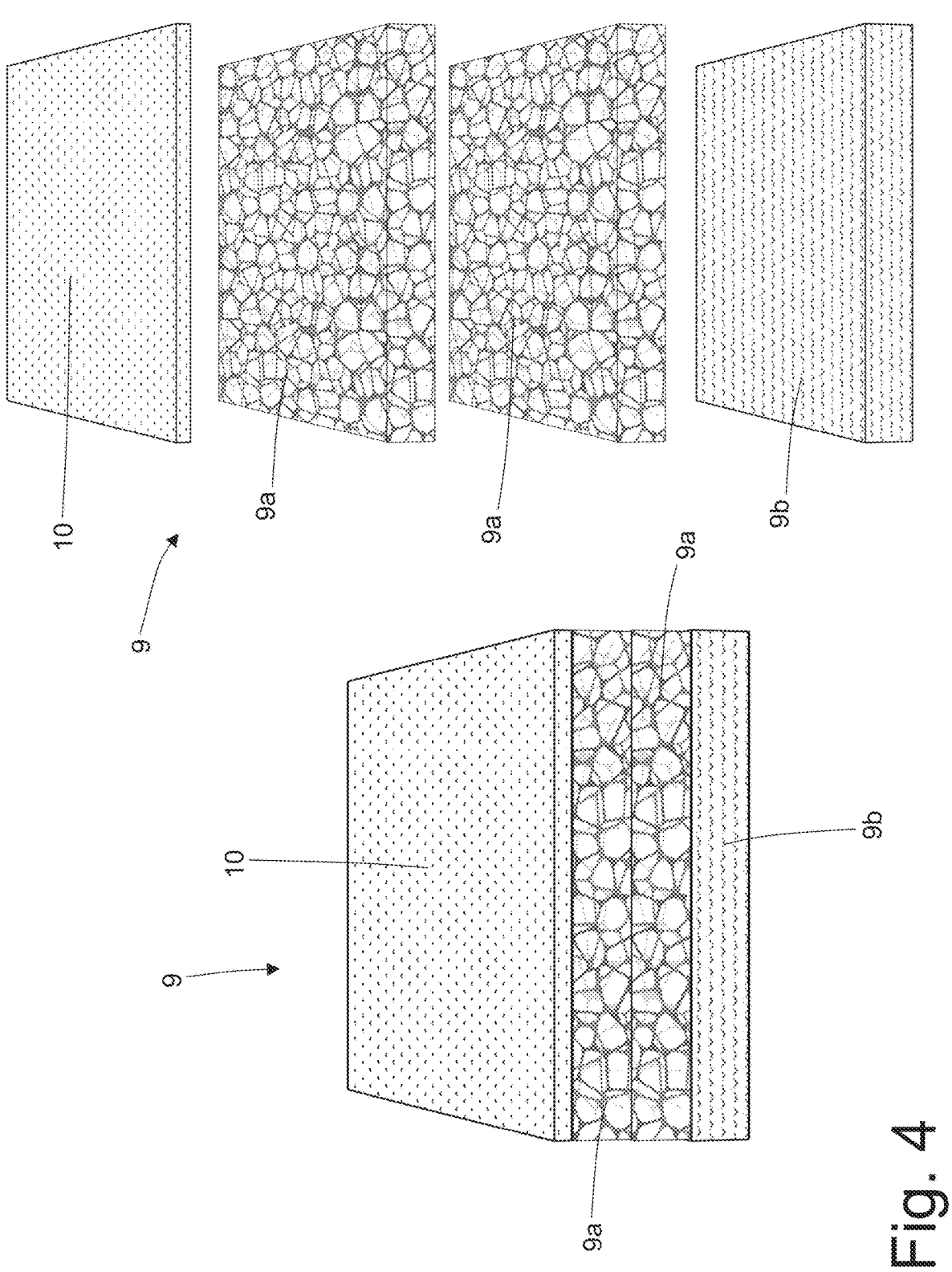

In the further embodiment shown in FIG. 4, the bearing structure 9 consists of two net-like layers 9a (independent of one another) and of a solid layer 9b overlapping one another; hence, the bearing structure 9 shown in FIG. 4 is different from the bearing structure 9 shown in FIG. 3 because of a larger number of net-like layers 9a (and, consequently, a smaller size of the solid layer 9b). According to a further embodiment which is not shown herein, the bearing structure 9 comprises three or four net-like layers 9a (independent of one another).

In all embodiments, the upholstery 10 always is in direct contact with a net-like layer 9a and is generally glued to the net-like layer 9a with which it is in contact.

According to a possible embodiment, the layers 9a and/or the layer 9a and the layer 9b simply rest on top of one another without any joining means between the layers 9a and/or 9b; according to an alternative embodiment, the layers 9a and 9b and/or the layer 9a and the layer 9b are joined to one another through gluing, namely are glued to one another.

According to a possible embodiment, in the cushion 6 and/or in the backrest 7, the bearing structure 9 has the same composition over the entire extension; according to an alternative embodiment, in the cushion 6 and/or in the backrest 7, the bearing structure 9 has a differentiated composition entailing a larger number of net-like layers 9a in some areas (typically, in large-load areas, which are more affected by the weight of the passenger) and a smaller number of net-like layers 9a in other areas (typically, small-load areas, which are less affected by the weight of the passenger). For example, the bearing structure 9 could comprise at least one area where there are two net-like layers 9a and at least another area where there is one single net-like layer 9a; alternatively, the bearing structure 9 could comprise at least one area where there are three net-like layers 9a and at least another area where there is one single net-like layer 9a or there are two net-like layers 9a.

The road vehicle 1 comprises an air conditioning system 11 provided, among other things, with an air treatment unit 12, which is configured to produce conditioned air (namely, air that was heated or cooled), which is released into the passenger compartment 2 through a plurality of air vents.

The seat 5 comprises a diffuser 13, which at least partially engages a front wall of the bearing structure 9 of the cushion 6 and is connected to a conditioned air supply duct 14 coming from the air treatment unit 12 of the air conditioning system 11 in order to introduce (diffuse) conditioned air into the bearing structure 9 of the cushion 6. Namely, the diffuser 13 is an inlet gate for the conditioned air coming from the supply duct 14 so as to allow said conditioned air to flow into the bearing structure 9 of the cushion 6. According to a preferred embodiment, the diffuser 13 substantially has the same width as the bearing structure 9 of the cushion 6 and can have a height that is the same as or smaller than the height of the bearing structure 9 of the cushion 6. The diffuser 13 is configured to introduce the air received from the supply duct 14 into the entire front surface (namely, the front wall) of the bearing structure 9 of the cushion 6, so that said air can spread within the bearing structure 9 of the cushion 6.

The seat 5 comprises at least one insulating element 15, which is arranged along a lower wall and/or a side wall of the bearing structure 9 of the cushion 6 and is impermeable to air in order to prevent air from flowing out. In particular, the insulating element 15 is an integral part of the seat 5 (namely, is integral to the seat 5) and is firmly joined to the bearing structure 9 of the cushion 6 so as to create, with the bearing structure 9 of the cushion 6, an air-tight coupling.

The aim of the insulating element 15 is that of sealing the lower wall and the side wall of the bearing structure 9 of the cushion 6 so that the air introduced by the diffuser 13 at the front remains within the bearing structure 9 of the cushion 6 up to the rear wall of the bearing structure 9 of the cushion 6 (hence, flowing through the entire bearing structure 9 of the cushion 6 from side to side).

According to a preferred embodiment, the insulating element 15 has a through opening, which allows air to flow out and is preferably arranged in a rear area of the bearing structure 9 of the cushion 6; the through opening can be arranged through the rear wall of the bearing structure 9 of the cushion 6 or through the lower wall of the bearing structure 9 of the cushion 6 and close to the rear wall of the bearing structure 9 of the cushion 6.

According to a possible embodiment, the bearing structure 9 of the cushion 6 is pneumatically connected to the bearing structure 9 of the backrest 7 so that at least part of the air flowing in the bearing structure 9 of the cushion 6 also flows to the bearing structure 9 of the backrest 7. For example, the bearing structure 9 of the cushion 6 could directly and intimately be connected (without gaps) to the bearing structure 9 of the backrest 7 (namely, forming one single indivisible body with bearing structure 9 of the backrest 7) or there could be at least one connection duct creating a connection allowing air to flow from the bearing structure 9 of the cushion 6 to the bearing structure 9 of the backrest 7.

According to a possible embodiment, the upholstery 10 of the cushion 6 and of the backrest 7 completely lacks through holes, so that it is substantially impermeable to air everywhere. According to an alternative embodiment, only an upper wall of the upholstery 10 of the cushion 6, on which, in use, a passenger of the seat 5 seats, and only a front wall of the upholstery 10 of the backrest 7, against which, in use, a passenger of the seat 5 rests, have a plurality of through micro-holes, which allow for the passage of air; in this way, part of the air flowing inside the bearing structure 9 flows out of the upholstery 10, thus directly reaching the passenger of the seat 5.

In the embodiment shown in FIG. 1, the insulating element 15 completely insulates the lower wall and the side wall of the bearing structure 9 of the cushion 6 and only partially insulates the rear wall of the bearing structure 9 of the cushion 6 so as to allow air to flow out through the rear wall of the bearing structure 9 of the cushion 6. According to an alternative embodiment, the insulating element 15 also completely insulates the rear wall of the bearing structure 9 of the cushion 6 so that all the air flowing in the bearing structure 9 of the cushion 6 has to flow to the bearing structure 9 of the backrest 7.

The bearing structure 9 of the cushion 6 preferably is spaced apart from the floor of the passenger compartment 2 and, hence, is at a distance other than zero from the floor of the passenger compartment 2; similarly, the insulating element 15 is an integral part of the seat 5, is integral to the bearing structure 9 of the cushion 6 and, therefore, also is separate and spaced apart from the floor of the passenger compartment 2.

In the embodiment shown in FIG. 1, a further insulating element 16 is provided, which is arranged along a rear wall and a side wall of the bearing structure 9 of the backrest 7.

In the embodiment shown in FIG. 1, the air coming from the air conditioning system 11 through the supply duct 14 is caused to flow, at first, through the bearing structure 9 of the cushion 6 and, subsequently, through the bearing structure 9 of the backrest 7. According to a different embodiment which is not shown herein, the air coming from the air conditioning system 11 through the supply duct 14 is caused to only flow through the bearing structure 9 of the cushion 6.

In the embodiment shown in FIG. 1, the air treatment unit 12 is arranged in a front position, the diffuser 13 at least partially engages the front wall of the bearing structure 9 of the cushion 6 and the insulating element 15 only partially insulates (or does not insulate at all) the rear wall of the bearing structure 9 of the cushion 6; in this way, the air coming from the air treatment unit 12 through the supply duct 14 flows into the cushion 6 of the seat 5 at the front and flows out of the cushion 6 of the seat 5 at the back (namely, the cushion 6 of the seat 5 also serves as a "channel" to convey the air coming from the treatment unit 12 from the front of the seat 5 to the back of the seat 5). In the alternative embodiment shown in FIG. 5, the air treatment unit 12 is arranged in a rear position, the diffuser 13 at least partially engages the rear wall of the bearing structure 9 of the cushion 6 and the insulating element 15 only partially insulates (or does not insulate at all) the front wall of the bearing structure 9 of the cushion 6; in this way, the air coming from the air treatment unit 12 through the supply duct 14 flows into the cushion 6 of the seat 5 at the back and flows out of the cushion 6 of the seat 5 at the front (namely, the cushion 6 of the seat 5 also serves as a "channel" to convey the air coming from the treatment unit 12 from the back of the seat 5 to the front of the seat 5).

Figure 5:
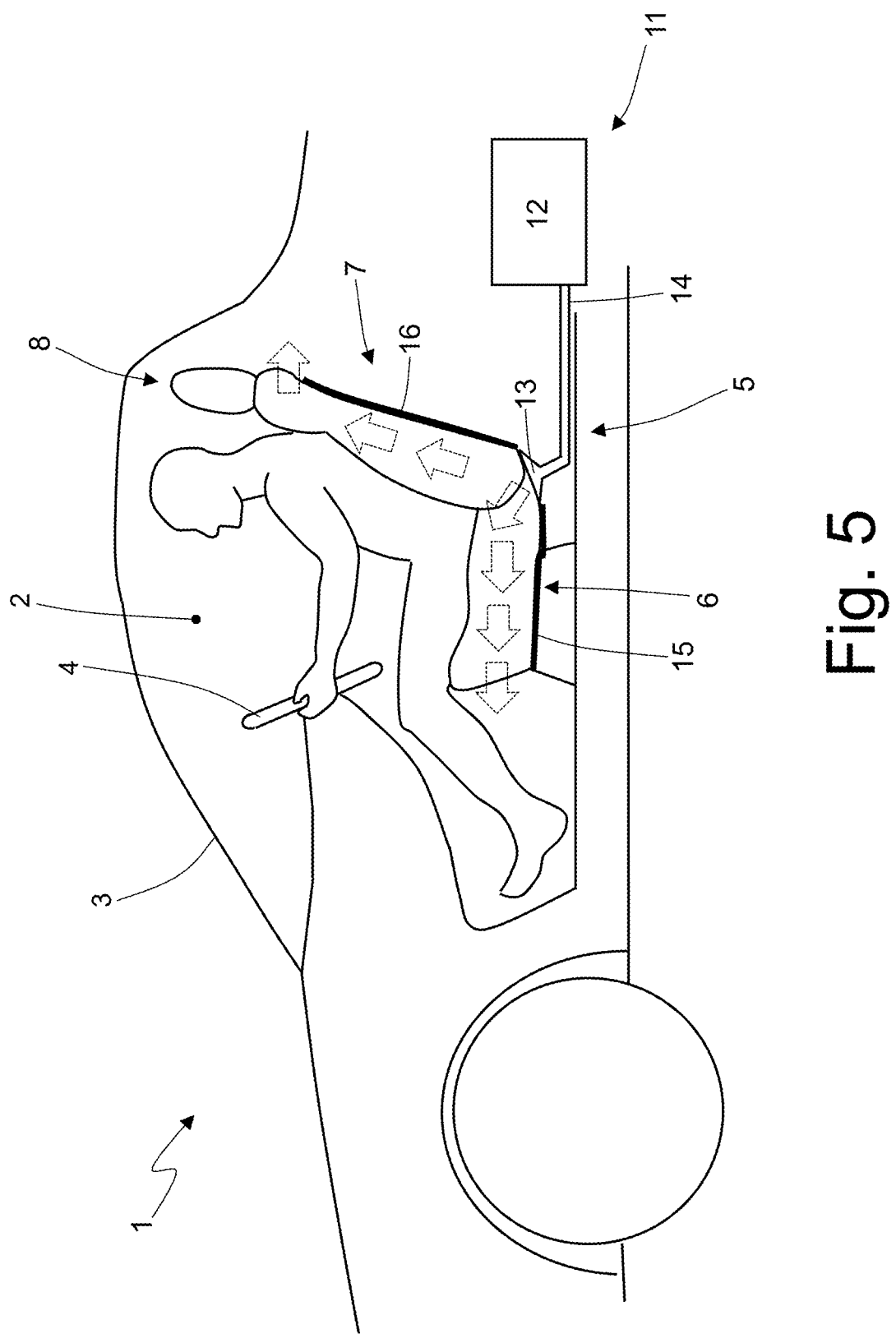
FIG. 5 is a schematic view of a different embodiment of a car provided with a set according to the invention.

In other words, in the embodiment shown in FIG. 5, the direction in which the air flows through the cushion 6 of the seat 5 is reversed compared to the embodiment shown in FIG. 1: in the embodiment shown in FIG. 5, the air flows through the seat from the back to the front (i.e. it flows in at the back and flows out at the front), whereas, in the embodiment shown in FIG. 1, the air flows through the seat from the front to the back (i.e. it flows in at the front and flows out at the back). In both embodiments, part of the air flowing into the cushion 6 of the seat can be deflected or not deflected towards the backrest 7 of the seat.

It should be pointed out that the cushion 6 could basically be used only as a "channel" to convey the air coming from the treatment unit 12 from the back of the seat 5 to the front of the seat 5 or vice versa; in this variant, the upholstery 10 of the cushion 6 and of the backrest 7 completely lacks through holes, so that it is substantially impermeable to air everywhere.

The embodiments described herein can be combined with one another, without for this reason going beyond the scope of protection of the invention.

The seat 5 described above can advantageously be used in any type of road vehicle (for example, a car or a motorcycle) and also in any type of non-road vehicle.

The seat 5 described above has numerous advantages.

First of all, the seat 5 described above offers an effective air conditioning thanks to the passage of conditioned air through the bearing structure 9 of the cushion 6 and (if necessary) of the backrest 7; in this way, indeed, the bearing structure 9 of the seat 1 can be heated or cooled in order to obtain an effective heating or cooling of the body of the passenger of the seat 5.

Furthermore, the seat 5 described above offers an effective air conditioning, since the cold or heat transmitted to the bearing structure 9 directly cools or heats the body of the passenger of the seat 5; in this way, the passenger of the seat 5 receives a welcome feeling using a smaller quantity of energy compared to the sole air conditioning of the air present in the passenger compartment 2 (which can have a very large volume, which mainly remains unused when there is only the driver).

The seat 5 described above allows the air coming from the treatment unit 12 to be transferred from the front to the back (like in the embodiment shown in FIG. 1) or it allows the air coming from the treatment unit 12 to be transferred from the back to the front (like in the embodiment shown in FIG. 5), without having to provide dedicated air ducts.

Finally, the seat 5 described above features a relatively small manufacturing cost, since the bearing structure 9 already has a net-like nature and, therefore, only requires the addition of the supply duct 14, of the diffuser 13 and of the insulating elements 15 and 16, which are details made of plastic materials, with a moderate cost and with substantially irrelevant weight and sizes. Indeed, the seat 5 exploits the fact that the net-like bearing structure 9 is substantially empty on the inside (namely, the largest part of the inner volume of the net-like bearing structure 9 basically consists of empty spaces rather than solid spaces) and, therefore, the net-like bearing structure 9 can become a large conditioned air "duct" to spread conditioned air to the entire seat 5.

LIST OF THE REFERENCE NUMBERS OF THE FIGURES

1 road vehicle
2 passenger compartment
3 windshield
4 steering wheel
5 seat
6 cushion
7 backrest
8 headrest
9 bearing structure
10 upholstery
11 air conditioning system
12 air treatment unit
13 diffuser
14 supply duct
15 insulating element
16 insulating element

The invention claimed is:

1. A seat (5) for a vehicle (1) and comprising:
a cushion (6), which is configured to be fixed to a floorboard of the vehicle (1) and is provided with a bearing structure (9), which is elastically yielding and has an at least partially lattice conformation, and with an upholstery (10), which covers the bearing structure (9);
a diffuser (13), which at least partially engages a front or rear wall of the bearing structure (9) of the cushion (6) and can be connected to a conditioned air supply duct (14) in order to introduce conditioned air into the bearing structure (9) of the cushion (6); and
at least one insulating element (15), which is an integral part of the seat (5), is arranged along a lower wall and/or a side wall of the bearing structure (9) of the cushion (6), is impermeable to air in order to prevent air from flowing out and is firmly joined to the bearing structure (9) of the cushion (6) so as to create, with the bearing structure (9) of the cushion (6), an air-tight coupling;
wherein the upholstery (10) of the cushion (6) lacks through holes, so that it is substantially impermeable to air.

2. The seat (5) according to claim 1, wherein the diffuser (13) is configured to introduce the air received from the supply duct (14) into a front or rear surface of the bearing structure (9) of the cushion (6), so that said air can spread within the bearing structure (9) of the cushion (6).

3. The seat (5) according to claim 1, wherein only an upper wall of the upholstery (10) of the seat (6), on which, in use, a passenger of the seat (5) seats, has a plurality of through holes, which allow for the passage of air.

4. The seat (5) according to claim 1, wherein the insulating element (15) has a through opening, which allows air to flow out.

5. A seat (5) for a vehicle (1) and comprising:
a cushion (6), which is configured to be fixed to a floorboard of the vehicle (1) and is provided with a bearing structure (9), which is elastically yielding and has an at least partially lattice conformation, and with an upholstery (10), which covers the bearing structure (9);
a diffuser (13), which at least partially engages a front or rear wall of the bearing structure (9) of the cushion (6)

and can be connected to a conditioned air supply duct (14) in order to introduce conditioned air into the bearing structure (9) of the cushion (6); and at least one insulating element (15), which is an integral part of the seat (5), is arranged along a lower wall and/or a side wall of the bearing structure (9) of the cushion (6), is impermeable to air in order to prevent air from flowing out and is firmly joined to the bearing structure (9) of the cushion (6) so as to create, with the bearing structure (9) of the cushion (6), an air-tight coupling;

wherein the insulating element (15) has a through opening, which allows air to flow out;

wherein the through opening of the insulating element (15) is arranged through the rear or front wall of the bearing structure (9) of the cushion (6) opposite the diffuser (13), so that the air flow can flow through the cushion (6) from the front to the back or vice versa.

6. A seat (5) for a vehicle (1) and comprising:

a cushion (6), which is configured to be fixed to a floorboard of the vehicle (1) and is provided with a bearing structure (9), which is elastically yielding and has an at least partially lattice conformation, and with an upholstery (10), which covers the bearing structure (9);

a diffuser (13), which at least partially engages a front or rear wall of the bearing structure (9) of the cushion (6) and can be connected to a conditioned air supply duct (14) in order to introduce conditioned air into the bearing structure (9) of the cushion (6); and at least one insulating element (15), which is an integral part of the seat (5), is arranged along a lower wall and/or a side wall of the bearing structure (9) of the cushion (6), is impermeable to air in order to prevent air from flowing out and is firmly joined to the bearing structure (9) of the cushion (6) so as to create, with the bearing structure (9) of the cushion (6), an air-tight coupling;

wherein the insulating element (15) has a through opening, which allows air to flow out;

wherein the through opening of the insulating element (15) is arranged through the lower wall of the bearing structure (9) of the cushion (6) and close to the rear or front wall of the bearing structure (9) of the cushion (6) opposite the diffuser (13), so that the air flow can flow through the cushion (6) from the front to the back or vice versa.

7. A seat (5) for a vehicle (1) and comprising:

a cushion (6), which is configured to be fixed to a floorboard of the vehicle (1) and is provided with a bearing structure (9), which is elastically yielding and has an at least partially lattice conformation, and with an upholstery (10), which covers the bearing structure (9);

a diffuser (13), which at least partially engages a front or rear wall of the bearing structure (9) of the cushion (6) and can be connected to a conditioned air supply duct (14) in order to introduce conditioned air into the bearing structure (9) of the cushion (6);

at least one insulating element (15), which is an integral part of the seat (5), is arranged along a lower wall and/or a side wall of the bearing structure (9) of the cushion (6), is impermeable to air in order to prevent air from flowing out and is firmly joined to the bearing structure (9) of the cushion (6) so as to create, with the bearing structure (9) of the cushion (6), an air-tight coupling; and a backrest (7), which is connected to the cushion (6) and is provided with the bearing structure (9) and with the upholstery (10), which covers the bearing structure (9).

8. The seat (5) according to claim 7 and comprising a pneumatic connection, which allows air to flow from the bearing structure (9) of the cushion (6) to the bearing structure (9) of the backrest (7).

9. The seat (5) according to claim 7 and comprising at least one connection duct, which creates a connection allowing air to flow from the bearing structure (9) of the cushion (6) to the bearing structure (9) of the backrest (7).

10. The seat (5) according to claim 7, wherein the insulating element (15) completely insulates the lower wall, the side wall and the rear wall of the bearing structure (9) of the cushion (6).

11. The seat (5) according to claim 7 and comprising a further insulating element (15), which is arranged along a rear wall and/or a side wall of the bearing structure (9) of the backrest (7).

12. The seat (5) according to claim 7, wherein the bearing structure (9) is a single-layer structure and consists of one single lattice layer.

13. The seat (5) according to claim 7, wherein the bearing structure (9) comprises at least a lattice layer (9a) and a solid layer (9b), preferably made of a solid foam, overlapping one another.

14. The seat (5) according to claim 13, wherein the upholstery (10) is in direct contact with the net likelattice layer (9a).

15. The seat (5) according to claim 13, wherein the layers (9a, 9b) are glued to one another.

16. A seat (5) for a vehicle (1) and comprising:

a cushion (6), which is configured to be fixed to a floorboard of the vehicle (1) and is provided with a bearing structure (9), which is elastically yielding and has an at least partially lattice conformation, and with an upholstery (10), which covers the bearing structure (9);

a diffuser (13), which at least partially engages a front or rear wall of the bearing structure (9) of the cushion (6) and can be connected to a conditioned air supply duct (14) in order to introduce conditioned air into the bearing structure (9) of the cushion (6); and at least one insulating element (15), which is an integral part of the seat (5), is arranged along a lower wall and/or a side wall of the bearing structure (9) of the cushion (6), is impermeable to air in order to prevent air from flowing out and is firmly joined to the bearing structure (9) of the cushion (6) so as to create, with the bearing structure (9) of the cushion (6), an air-tight coupling;

wherein the bearing structure (9) is a single-layer structure and consists of one single lattice layer;

wherein the bearing structure (9) has a differentiated composition entailing at least a first area where the bearing structure (9) has a larger number of lattice layers (9a) and a second area where the bearing structure (9) has a smaller number of lattice layers (9a).

17. The seat (5) according to claim 16, wherein the first area is more affected by the weight of the passenger and the second area is less affected by the weight of the passenger.

18. The seat (5) according to claim 16, wherein the first area of the bearing structure (9) comprises at least one lattice layer (9a) more than the second area of the bearing structure (9).

19. A road vehicle (1) comprising:

a passenger compartment (2) delimited, at the bottom, by a floor;

at least one seat (5), which is arranged in the passenger compartment (2) and is manufactured according to claim 1; and an air conditioning system (11) provided with a conditioned air supply duct (14), which ends in the diffuser (13) of the seat (5).

20. The road vehicle (1) according to claim 19, wherein the bearing structure (9) of the cushion (6) is spaced apart from the floor and, hence, is at a distance other than zero from the floor.

21. The road vehicle (1) according to claim 19, wherein the insulating element (15) is an integral part of the seat (5) and, hence, is separate and spaced apart from the floor.

\* \* \* \* \*